2 Sheets--Sheet 1.

L. M. BATTY.

Improvement in Harvesters.

No. 5,058. Reissued Sep. 17, 1872.

*Witnesses:-*
W. H. Rowe.
Joel Peyton.

Windley M. Batty
by his Atty
Wm D. Baldwin

AM. PHOTO-LITHOGRAPHIC CO. N.Y. (OSBORNE'S PROCESS.)

2 Sheets--Sheet 2.
L. M. BATTY.
Improvement in Harvesters.
No. 5,058. Reissued Sep. 17, 1872.
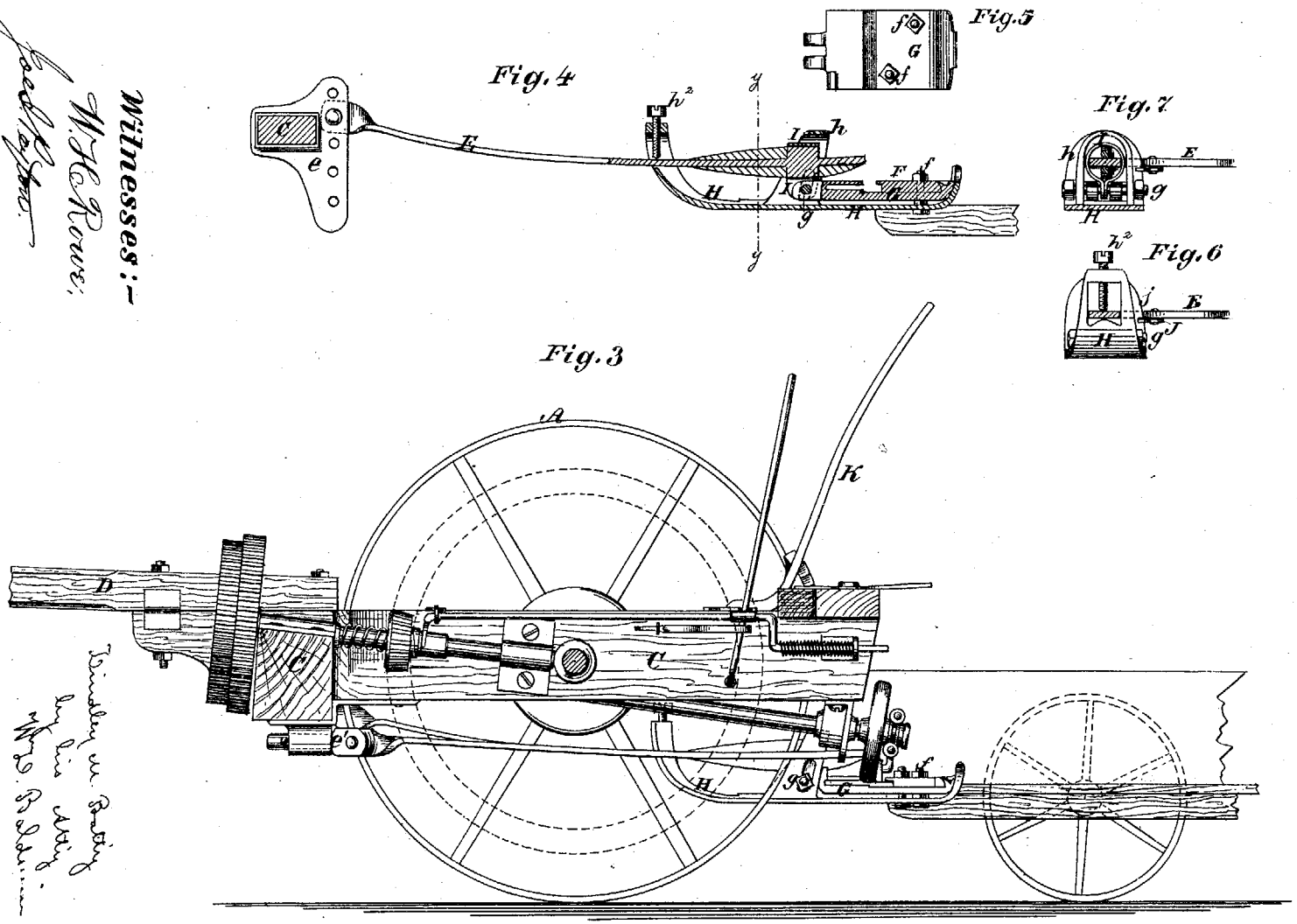
Witnesses:-
W. H. Rowe.
Joe S. Payson.
Lindley M. Batty
by his Atty
W. D. Baldwin
AM. PHOTO-LITHOGRAPHIC CO. N.Y. (OSBORNE'S PROCESS.)

UNITED STATES PATENT OFFICE.

LINDLEY M. BATTY, OF CANTON, OHIO, ASSIGNOR TO WILLIAM K. MILLER, OF SAME PLACE.

IMPROVEMENT IN HARVESTERS.

Specification forming part of Letters Patent No. 49,963, dated September 19, 1865; reissue No. 5,058, dated September 17, 1872.

DIVISION A.

*To all whom it may concern:*

Be it known that I, LINDLEY M. BATTY, of Canton, in the county of Stark and State of Ohio, have invented certain new and useful Improvements in Harvesters, of which the following is a specification:

The subject-matter claimed in this division more especially relates to harvesters having two main wheels mounted on an axle carrying a main frame, to which a coupling-frame is hinged, a finger-beam being so hinged to said coupling-frame as to allow the cutting apparatus to rise and fall freely at either end, to conform to irregularities of the surface over which it glides, without affecting the movements of the main frame. The subject-matter claimed is hereinafter particularly specified.

The accompanying drawing shows so much only of a harvester embracing my improvements as is necessary to illustrate the invention herein claimed; the details of the construction of the other parts of the machine being well understood need not here be specifically described.

Figure 2:
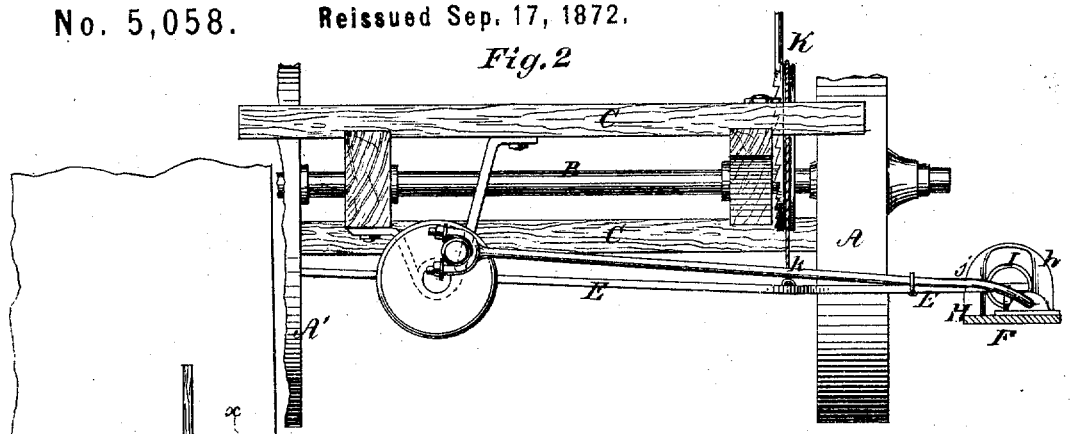
Figure 1:
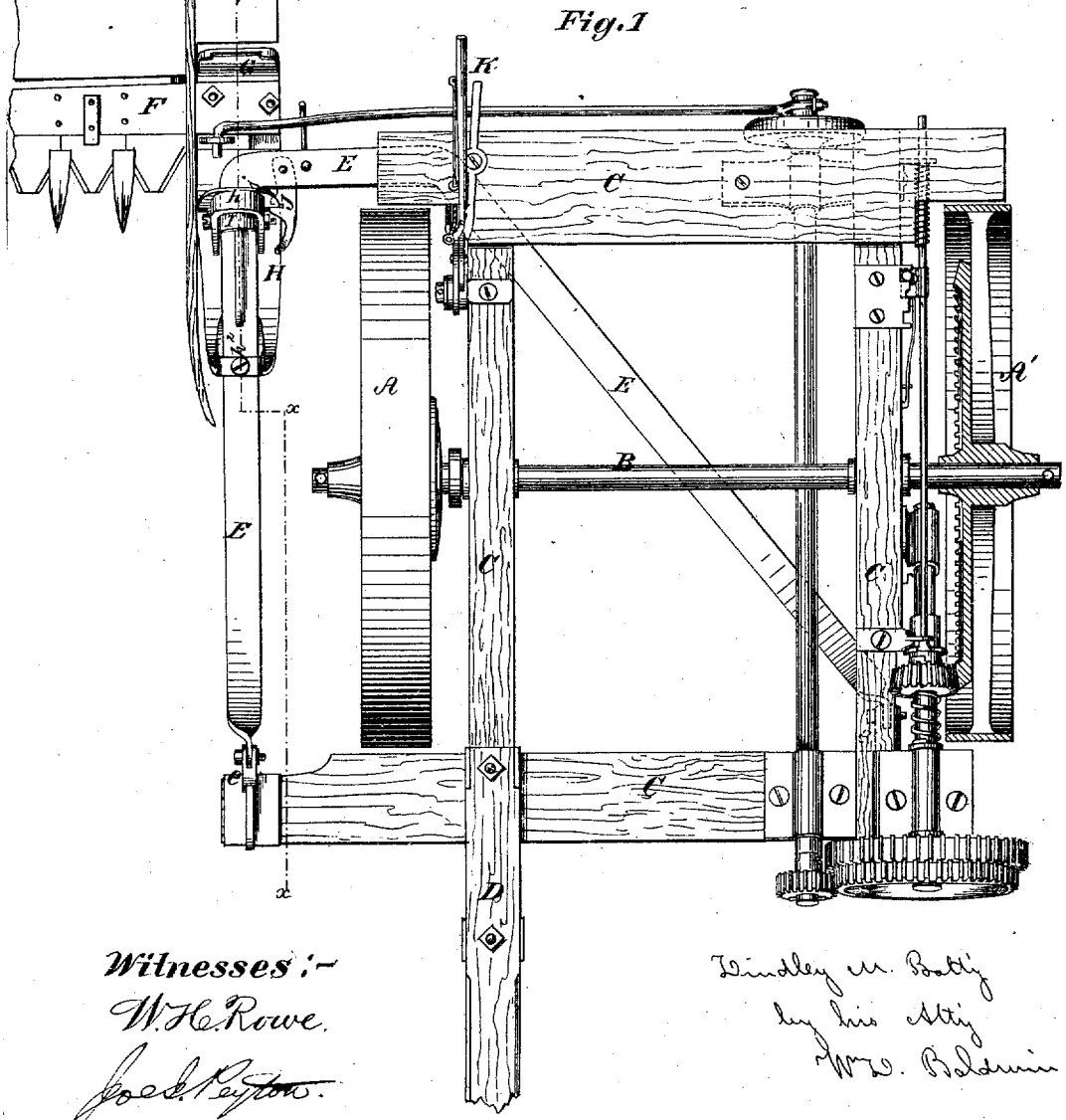

Figure 1 represents a plan; Fig. 2, a rear elevation; Fig. 3, a side elevation with the near wheel removed; Fig. 4, a side elevation, partly in section, on the line *x x* of Fig. 1, showing the drag-bar and shoe; Fig. 5, a plan of part of the shoe detached; Fig. 6, a front view of the shoe; and Fig. 7, a transverse section therethrough on the line *y y* of Fig. 4, looking rearward.

Two wheels, A A′, turn on an axle, B, which supports a main frame, C, from which a tongue, D, projects, as usual. A drag-bar or coupling-frame, E, formed in this instance of a continuous bar of metal, is pivoted to the main frame. The side of the coupling-frame next the finger-beam is parallel with the inner wheel and pin-jointed to a bracket, *e*, Fig. 4, secured to the front cross-timber of the main frame. The rear portion of the coupling-frame is parallel to said front cross-timber. The outer portion of the coupling-frame extends diagonally forward, and is pin-jointed to a swivel-bolt, *e′*, Fig. 3, working in a socket under the front cross-timber above-mentioned. This mode of construction permits the inner front end of the drag-bar or coupling-frame to be adjusted up or down by inserting a pin through it and through one of a series of holes in the bracket above mentioned. A finger-beam, F, is bolted to a shoe, G. Bolts *f* also pass through the finger-beam, the shoe, and a runner, H, the bolt-holes in the shoe being enlarged to allow the shoe to rock vertically on the bolts. A small roller may be interposed between the shoe and runner as a fulcrum, on which the shoe may rock. The heel of the shoe plays vertically in a slot in the runner. A bolt, *g*, passes through lugs on the toe of the shoe and through slots in an arch, *h*, on the runner. This bolt likewise passes through a ring, I. (See Fig. 7.) This ring rocks on the bolt. That portion of the drag-bar or coupling-arm which passes through the ring has a flange or rib formed upon its upper and under sides, its edges abutting against the sides of the ring. (See Fig. 7.) This portion of the bar also tapers slightly toward its front end, and its under side is rounded, as shown in Fig. 4. The runner H is turned up in front and perforated (see Fig. 6) for the passage of the drag-bar E through it. A set-screw, $h^2$, on this runner bears upon the drag-bar. A hook, J, on the drag-bar, engages with a flange, *j*, on the arch *h*, thus allowing the runner to swing on the drag-bar, while preventing it from moving forward.

By the mode of construction above described the shoe can rock in the runner; both the shoe and runner can turn around the coupling-arm as a hinge to raise the divider-end of the finger-beam; the points of the guards can be set higher or lower by means of the set-screw.

The drag-bar is raised or lowered by means of a lifting-lever, K, and cord *k*, and is held at any desired elevation by a detent of well-known construction.

I claim as my invention—

The combination, in a harvester, of a main frame, a drag-bar pivoted thereto, mechanism for adjusting the front end of said drag-bar vertically, a perforated runner, (carrying the finger-beam,) through which runner the drag-bar passes, and which swings on the drag-bar, substantially as set forth, to adjust the inclination of the guards and to allow the finger-beam freely to rise and fall at either end by swinging on the drag-bar.

LINDLEY M. BATTY.

Witnesses:

A. McKINLEY,

WM. McKINLEY, Jr.